Sept. 22, 1942.　　　G. I. GOODWIN　　　2,296,515
CLUTCH PLATE
Filed May 18, 1940　　　　3 Sheets-Sheet 1

INVENTOR.
George I. Goodwin,
BY Cromwell, Greist & Warden
attys.

Sept. 22, 1942.　　　G. I. GOODWIN　　　2,296,515
CLUTCH PLATE
Filed May 18, 1940　　　3 Sheets-Sheet 2
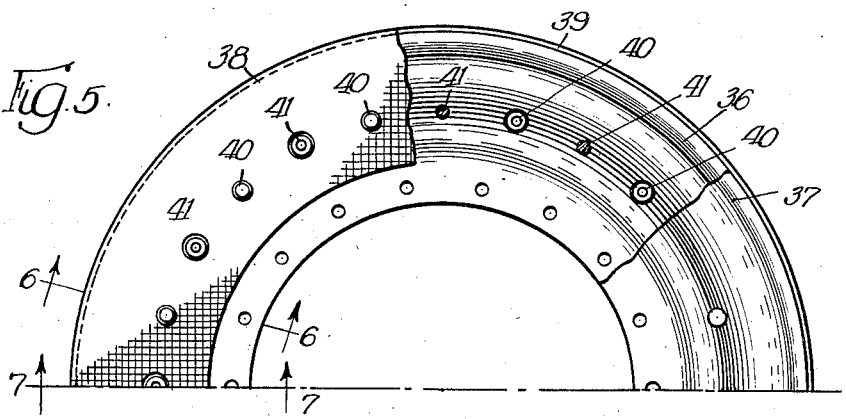
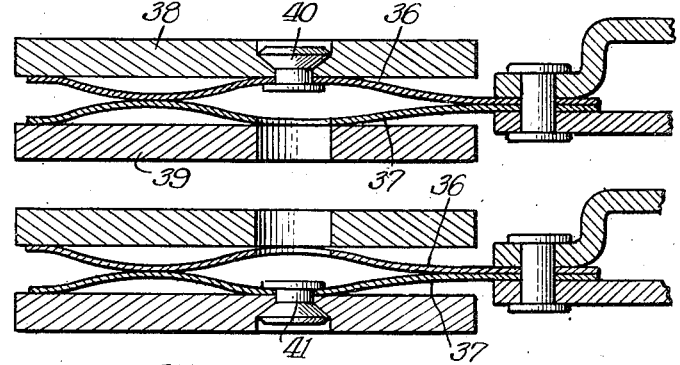
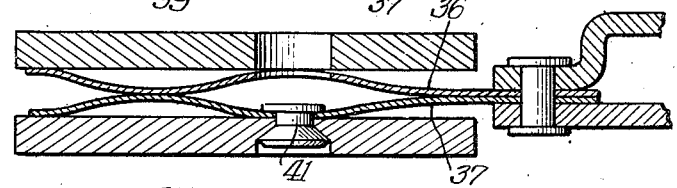
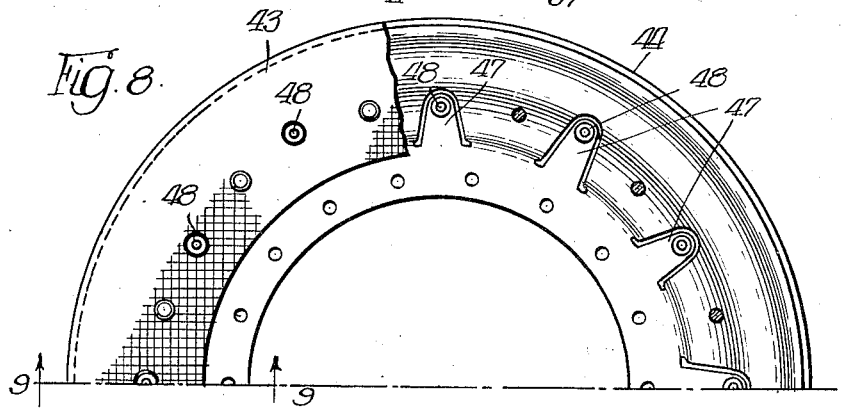
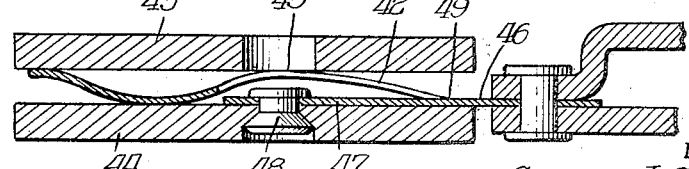
INVENTOR.
George I. Goodwin,
BY Cromwell, Greist & Warden
attys.

Sept. 22, 1942.　　　　G. I. GOODWIN　　　　2,296,515
CLUTCH PLATE
Filed May 18, 1940　　　　3 Sheets-Sheet 3
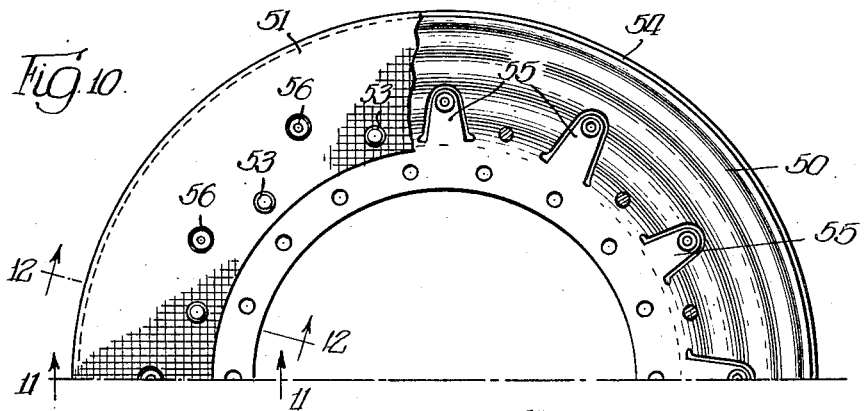
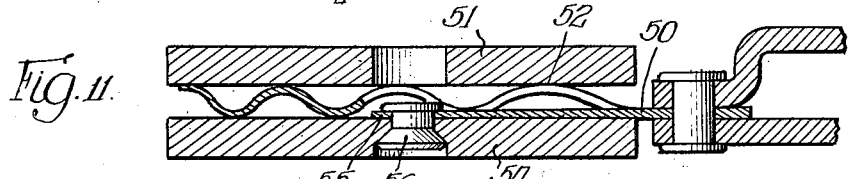
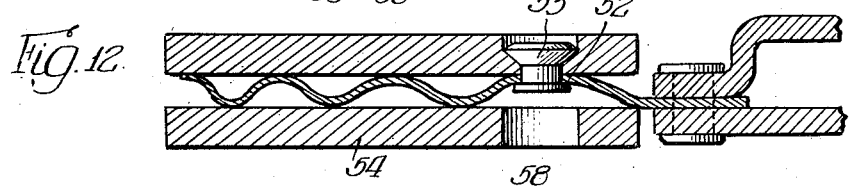
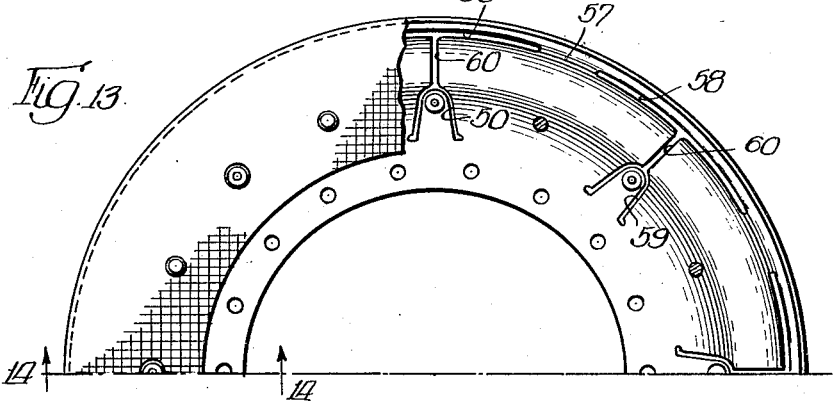
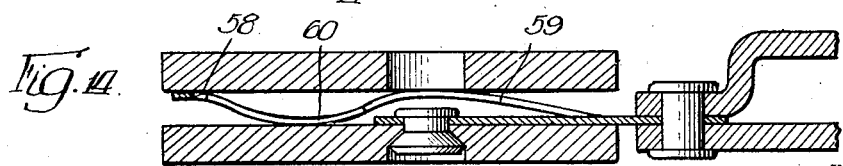
INVENTOR.
George I. Goodwin,
BY Cromwell, Greist & Warden
attys.

Patented Sept. 22, 1942

2,296,515

UNITED STATES PATENT OFFICE 2,296,515

CLUTCH PLATE

George I. Goodwin, Detroit, Mich.

Application May 18, 1940, Serial No. 336,027

13 Claims. (Cl. 192—107)

The present invention relates to clutch plates, and more particularly to clutch plates of the type in which a resiliently yieldable cushioning structure is employed adjacent the periphery of the plate between the annular friction facings.

The principal object of the invention is to provide an improved cushioning structure, which is inexpensive to manufacture, affords a new and excellent form of support for the facings, is light in weight, has a low spinning inertia, and will function efficiently over a period of time under the most severe service.

Other more specific objects of the invention are the provision of a cushioning structure in which the facings are supported against a plurality of concentric cushioning formations which are integral portions of a single sheet metal spring which extends without interruption about the entire circumference of the plate; in which the flattening incident to compression involves not only the usual kind of bending but also a uniform circumferential stretching of the outer portion of the spring material and a uniform circumferential compression of the inner portion of the spring material over the entire circumferential area of the spring; in which the concentric cushioning formations presented by the spring encircle the entire plate; and in which such formations are so curved in radial section as to increase their areas of contact with the facings as the plate is subjected to compression, with a corresponding decrease in the beam lengths between the areas and a resulting accelerated increase in resistance to compression.

While the foregoing statements are indicative in a general way of the nature of the invention, other more specific objects and advantages will be apparent to those skilled in the art upon a full understanding of the novel cushioning structure. Several different embodiments of the invention are presented herein by way of illustration, but it will of course be appreciated that the invention is susceptible of incorporation in still other structurally modified forms coming equally within the scope of the appended claims.

Figure 1:
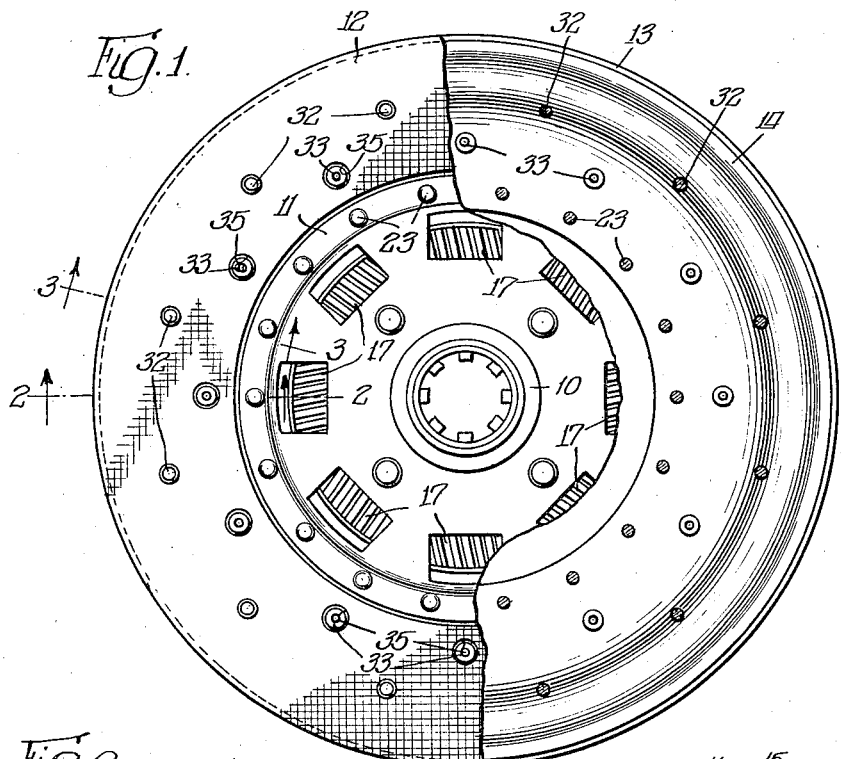
Fig. 1 is a face view of a clutch plate equipped with the cushioning means of the invention, with portions broken away to show other otherwise concealed portions.
Figure 2:
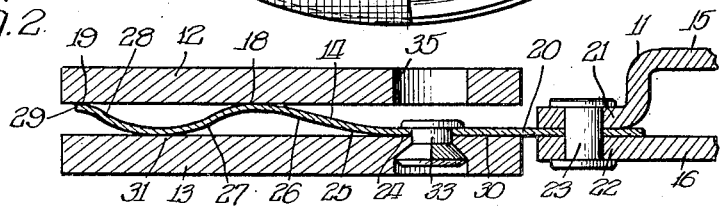
Fig. 2 is an enlarged radial section through the outer portion of the plate, taken on the line 2—2 of Fig. 1.
Figure 3:
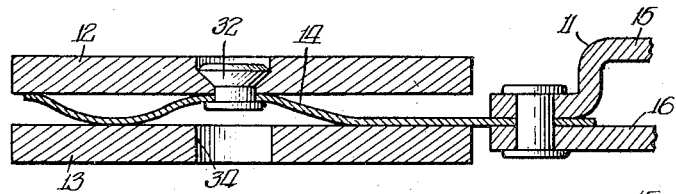
Fig. 3 is a similar section, taken on the line 3—3 of Fig. 1.
Figure 4:
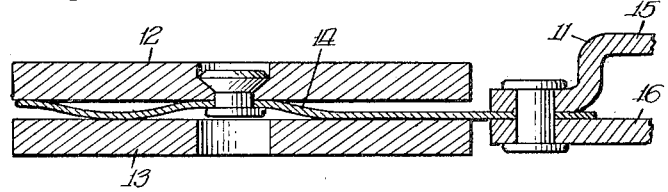

Fig. 4 corresponds to Fig. 3 but shows the plate with the cushioning structure in a partially compressed condition;

Fig. 5 is a partially broken away face view of one-half of another clutch plate, with the center portion of the plate removed, showing a modified form of the invention;

Fig. 6 is an enlarged radial section through the outer portion of the clutch plate shown in Fig. 5, taken on the line 6—6 of Fig. 5;

Fig. 7 is a similar section, taken on the line 7—7 of Fig. 5;

Fig. 8 is a partially broken away face view of one-half of another clutch plate, with the center portion of the plate removed, showing another form of the invention;

Fig. 9 is an enlarged radial section through the outer portion of the clutch plate shown in Fig. 8, taken on the line 9—9 of Fig. 8;

Fig. 10 is a partially broken away face view of one-half of another clutch plate, with the center portion of the plate removed, showing still another form of the invention;

Figs. 11 and 12 are enlarged radial sections through the outer portion of the clutch plate shown in Fig. 10, taken respectively on the lines 11—11 and 12—12 of Fig. 10;

Fig. 13 illustrates another modification of the invention; and

Fig. 14 is an enlarged radial section, taken on the line 14—14 of Fig. 13.

The clutch plate shown in Figs. 1 to 4 inclusive will first be described. This plate includes a hub 10, a disk 11 attached to the hub, two annular friction facings 12 and 13 beyond the periphery of the disk, and an annular sheet metal cushioning spring 14 between the facings. In this particular plate the disk 11 is composed of two cover plates 15 and 16, which cover plates are capable of limited rotation with respect to the hub 10 against the resistance offered by a plurality of coil springs 17 acting between the cover plates and a flange (not shown) on the hub, but this spring center feature has nothing to do with the present invention, the cover plates 15 and 16 being the equivalent of a single member connected rigidly with the hub so far as the invention is concerned. The invention resides, not in the construction of the center portion of the plate, but rather in the form of cushion afforded by the annular spring 14.

The facings 12 and 13 are flat, and are disposed in spaced parallel relation. The spring 14 occupies the space between the facings 12 and 13 and is characterized by a plurality of concentric annular embossments 18 and 19. The inner portion 20 of the spring is flat and is clamped rigidly between the outer edges 21 and 22 of the cover plates 15 and 16 by rivets 23. The flat inner portion 20 of the spring extends outwardly in engagement with the facing 13 to approximately the point 24. From this point the spring is bent toward the facing 12, leaving the facing 13 in a gradual curve. From the point 25 to the point 26 the spring extends almost straight, and from the point 26 to the point 27 the spring is curved gradually about a center disposed on the other side of the spring. From the point 27 to the point 28 the curvature is in the opposite direction, and from the point 28 to the extreme outer edge 29 the curvature is again reversed. This shaping of the spring presents the concentric supporting areas 18 and 19 for the facing 12 and the inwardly offset supporting areas 30 and 31 for the facing 13. These supporting areas are all concentric with the axis of the plate and extend continuously about the entire circumference of the latter, affording uniform support for both facings at all circumferentially spaced points. The facing 12 is attached by rivets 32 to the annular portion 18 of the spring in engagement with the same, while the facing 13 is attached by rivets 33 to the annular portion 20, the facing 13 being apertured or otherwise recessed at 34 to accommodate the heads of the rivets 32 when the spring is flattened out, and the facing 12 being similarly recessed at 35 to accommodate the heads of the rivets 33.

When the clutch plate is placed under compression, the annular spring 14 will progressively flatten out. The spring is shown in a partially compressed condition in Fig. 4. As will be noted in this figure, as the compression progresses, with the facing 12 (which is preferably disposed on the pressure plate side) moving toward the facing 13, the annular supporting areas 18, 19, 30 and 31 in contact with the facings will become radially wider and the intervening areas not in contact with the facings will become radially narrower, resulting in an accelerated increase in the resistance offered to compression, giving a highly desirable cushioning action characterized by a regulated and progressively increasing distribution of the load. As will be observed, the flat inner portion 20 of the spring 14 is rigidly clamped between the cover plates 15 and 16 in such manner as to provide a cantilever type of support for that portion of the spring 14 between the point 24 and the point 18.

The proportions of the bend in the spring 14 between the points 24 and 18 are such that the radial outward extension of the point 18, as the spring is compressed, is so inappreciable as not to disturb the anchorage of the rivets in the facing 12 even when the circumferential corrugations in the spring are flattened out in the fully compressed condition of the plate.

Important features of the cushion afforded by this specially designed spring 14 are the circumferentially continuous character of the supporting areas 18, 19, 30 and 31 of the spring, the undulated radial section of the spring affording a circumferentially uniform backing for both facings in radially staggered areas which increase in width as the compression increases, with consequent increase in resistance to load, and the lightness of the spring permitted by its endless form and its continuous attachment to the disk.

In the modification shown in Figs. 5, 6 and 7, two annular springs 36 and 37 of undulated radial section are employed, back-to-back, and the facings 38 and 39 are secured to the innermost annular embossments of the springs, the facing 38 being attached by the rivets 40 to the spring 36, and the facing 39 being attached by the rivets 41 to the spring 37. Both of the springs are embossed in the same way, with the embossments arranged directly opposite each other. The springs 36 and 37 are made of thicker sheet metal than the spring in the first described embodiment in order to jointly present the same total resistance to load.

In the modification shown in Figs. 8 and 9, a single annular spring 42 is employed between the facings 43 and 44. The facing 43 (on the pressure plate side) is secured to the innermost embossment 45 at the crest of the latter, in the same manner as in the first described embodiment, but the facing 44, instead of being attached near its inner edge to the flat inner portion 46 of the spring, is attached nearer its center to the outer ends of radially extending tongues 47, by means of rivets 48. The tongues 47 are cut from the body of the spring 19 and are disposed in the same plane as the flat inner portion 46. In this form of the invention the spring 42 need not continue outwardly any substantial distance in engagement with the facing 44 before bending toward the facing 43 to form the first annular embossment at 45, and the inclination of the bend from the point 49 to the point 45 may therefore be even more gradual than the corresponding inclination in the spring of the first described embodiment.

In the modification shown in Figs. 10, 11 and 12 a single annular spring 50 is again employed with the facing 51 (on the pressure plate side) attached to the crest of the innermost embossment 52 by rivets 53 and with the facing 54 attached to radial tongues 55 by rivets 56. In this modification however, the spring 50 is provided with a large number of concentric annular embossments, which embossments are preferably spaced progressively closer to each other as they approach the outer edges of the facings, with the inclinations between the embossments correspondingly more abrupt. Instead of being spaced progressively closer as they approach the outer edges, these embossments may be spaced progressively farther apart as they approach such edges. The spring 50 may also be tapered in cross section, either toward or away from the outer edge of the latter. While four annular contact areas are shown on each side of this corrugated spring, it will of course be appreciated that a larger or smaller number of contact areas might instead be employed.

In the modification shown in Figs. 13 and 14 the cross sectional shaping of the annular spring 57 is substantially the same as that shown in Figs. 8 and 9, and the attachment of the facings is also the same. The spring 57, however, is provided near its outer edge with arcuate relief slits 58, which slits are connected with the tongue cutouts 59 by radial slits 60, resulting in a decreased load resistance, which form of spring while retaining the circumferential continuity of the same is adaptable to applications where less resistance to load is desired without reduction in the thickness of the metal of the spring.

As will be appreciated from the foregoing, an important feature of the present invention resides in the provision of a circumferentially continuous cushioning member of extremely thin material, to afford lightness and at the same time permit of a maximum number of supporting areas, which possesses adequate load capacity and yet does not incorporate any sharp bends which would resist being flattened out under loads normally applied to a clutch plate.

I claim:

1. In a clutch plate, a pair of annular friction facings, and an annular cushioning spring between the facings provided with a plurality of circumferentially continuous concentric annular embossments, which embossments yieldingly space the facings from each other.

2. In a clutch plate, a pair of annular friction facings, and an annular cushioning spring between the facings provided with a plurality of concentric annular embossments and a plurality of circumferentially spaced tongues, one of the facings being attached to one of the embossments at one side of the spring, and the other facing being attached to the tongues at the other side of the spring.

3. In a clutch plate, a pair of annular friction facings, and an annular cushioning spring between the facings provided with a plurality of concentric annular embossments and a plurality of circumferentially spaced radial tongues, the unembossed surface of the spring being disposed in one radial plane, and the embossments on the other surface being all disposed in a second axially separated radial plane, one of the facings being attached to the innermost embossment in engagement with the other embossments, and the other facing being attached to the tongues in engagement with the unembossed surface of the spring.

4. In a clutch plate, the combination with a hub, a disk secured to the hub, and a pair of annular facings beyond the outer edge of the disk, of a circumferentially continuous cushioning spring which is substantially thinner than the disk and is positioned between the facings with its inner edge secured to the disk adjacent to but inwardly of the inner edges of the facings, said ring being of undulated radial section between the facings and being secured at axially offset portions of the same to the facings.

5. In a clutch plate, a pair of annular friction facings, and an annular cushioning spring between the facings, which spring is circumferentially continuous at its outer edge and is provided with circumferentially continuous portions of curved radial section for engagement with the facings.

6. In a clutch plate, a pair of annular friction facings, and an annular cushioning spring between the facings, which spring is circumferentially continuous at its inner and outer edges and is provided with circumferentially continuous portions of curved radial section for engagement with the facings.

7. In a clutch plate, a pair of annular friction facings, and an annular cushioning spring between the facings, which spring is circumferentially continuous at its inner and outer edges and is provided with portions of curved radial section for engagement with the facings, said engaging portions of the spring being of the same radial section at all points throughout the circumference of the spring.

8. In a clutch plate, a disk, a pair of annular friction facings beyond the periphery of the disk, and an annular cushioning spring of materially less thickness than the disk attached at its inner edge to the outer edge of the disk at a point adjacent the inner edges of the facings and disposed between the facings with portions of the spring attached to one of the facings and circumferentially spaced portions of the spring attached to the other facing, said spring being circumferentially continuous and being provided with portions of curved radial section for engagement with the facings.

9. In a clutch plate, a disk, a pair of annular friction facings beyond the periphery of the disk, and an annular cushioning spring attached at its inner edge to the outer edge of the disk and disposed between the facings with portions of the spring attached to one of the facings and circumferentially spaced portions of the spring attached to the other facing, said spring being circumferentially continuous and being provided with portions of curved radial section for engagement with the facings, said engaging portions of the spring being of the same radial section at all points throughout the circumference of the spring.

10. In a clutch plate, a pair of annular friction facings, and an annular cushioning spring between the facings provided with a plurality of concentric annular embossments, which embossments are located progressively closer toward each other toward one edge of the spring.

11. In a clutch plate, a pair of annular friction facings, and an annular cushioning spring between the facings provided with a plurality of concentric annular embossments, which embossments are located progressively closer toward each other toward the outer edge of the spring.

12. In a clutch plate, a pair of annular friction facings, and an annular cushioning spring between the facings provided with a plurality of concentric annular embossments, said spring being of progressively reduced cross section toward one of its edges.

13. In a clutch plate, a pair of annular friction facings, and an annular cushioning spring between the facings provided with a plurality of concentric annular embossments, said spring being of progressively reduced cross section toward its outer edge.

GEORGE I. GOODWIN.